(12) United States Patent
Niwa

(10) Patent No.: US 10,071,660 B2
(45) Date of Patent: Sep. 11, 2018

(54) VEHICLE SEAT

(71) Applicant: TOYOTA BOSHOKU KABUSHIKI KAISHA, Aichi-ken (JP)

(72) Inventor: Masayuki Niwa, Aichi-ken (JP)

(73) Assignee: TOYOTA BOSHOKU KABUSHIKI KAISHA, Aichi-Ken (JP)

( * ) Notice: Subject to any disclaimer, the term of this patent is extended or adjusted under 35 U.S.C. 154(b) by 119 days.

(21) Appl. No.: 15/221,930

(22) Filed: Jul. 28, 2016

(65) Prior Publication Data

US 2017/0028894 A1    Feb. 2, 2017

(30) Foreign Application Priority Data

Jul. 31, 2015    (JP) .................. 2015-151690

(51) Int. Cl.
*B60N 2/58* (2006.01)
*B60N 2/60* (2006.01)
*B60N 2/70* (2006.01)
*B60N 2/72* (2006.01)

(52) U.S. Cl.
CPC ......... *B60N 2/5825* (2013.01); *B60N 2/5858* (2013.01); *B60N 2/6009* (2013.01); *B60N 2/6018* (2013.01); *B60N 2/7094* (2013.01); *B60N 2/72* (2013.01)

(58) Field of Classification Search
CPC ...... B60N 2/58; B60N 2/5825; B60N 2/5858; B60N 2/6009; B60N 2/6018; B60N 2/7094; B60N 2/72
See application file for complete search history.

(56) References Cited

U.S. PATENT DOCUMENTS

| | | | |
|---|---|---|---|
| 2007/0029852 A1* | 2/2007 | Kobayashi | B60N 2/58 297/228.11 |
| 2011/0043013 A1* | 2/2011 | Sugiura | B60N 2/6009 297/228.11 |
| 2015/0091361 A1* | 4/2015 | Sahashi | B60N 2/58 297/452.18 |
| 2015/0307002 A1* | 10/2015 | Ushiyama | B60N 2/6009 297/452.59 |
| 2015/0307004 A1* | 10/2015 | Ushiyama | B60N 2/6009 297/452.18 |
| 2017/0028894 A1* | 2/2017 | Niwa | B60N 2/7094 |

FOREIGN PATENT DOCUMENTS

| | | | | |
|---|---|---|---|---|
| JP | 2003320880 A | * | 11/2003 | .......... B60N 2/6009 |
| JP | 2007-22502 | | 2/2007 | |
| JP | 2007022502 A | * | 2/2007 | ............... B60N 2/58 |
| JP | 2013056612 A | * | 3/2013 | ............... B60N 2/58 |
| JP | 5402591 B2 | * | 1/2014 | ............... B60N 2/58 |
| JP | 2015-66222 | | 4/2015 | |

* cited by examiner

*Primary Examiner* — Ryan D Kwiecinski
(74) *Attorney, Agent, or Firm* — Greenblum & Bernstein, P.L.C.

(57) ABSTRACT

A vehicle seat includes: a seat cushion including another member disposed on a back side of a seat pad, and a catching portion provided in the another member; a seatback; a strip attached to the seatback; and a band member provided in the strip. The band member is hooked on the catching portion on a back side of the seat cushion. The catching portion includes a holding part and a guide part. The holding part has an opening that is opened toward a side facing the seat pad. The guide part is a flat part inclined from the opening. The band member is inserted into the opening and placed inside the holding part.

5 Claims, 7 Drawing Sheets

VEHICLE SEAT

INCORPORATION BY REFERENCE

The disclosure of Japanese Patent Application No. 2015-151690 filed on Jul. 31, 2015 including the specification, drawings and abstract is incorporated herein by reference in its entirety.

BACKGROUND OF THE INVENTION

1. Field of the Invention

The present invention relates to a vehicle seat including a seat cushion, a seatback, and a strip covering an area between the seat cushion and the seatback.

2. Description of Related Art

As a vehicle seat of this type, there has been disclosed a vehicle seat including a seat cushion, a seatback, and a hiding cover corresponding to a strip of the present invention (see Japanese Patent Application Publication No. 2007-22502 (JP 2007-22502 A)). In the vehicle seat, the seat cushion includes a seat pad elastically supporting an occupant, a seat frame, which is a generally rectangular frame body, and a cushion spring corresponding to another member in the present invention. The cushion spring is a wire spring extending in a seat front-rear direction while bending in a generally S-shape, and is placed inside the seat frame so as to support a seat pad from a back surface. The seatback rises from a rear part of the seat cushion, and the hiding cover hangs down from a lower part of a rear face of the seatback. A pair of band-shaped belts corresponding to a band member of the present invention are attached to a bottom end of the hiding cover, and each of the band-shaped belts is provided with a first latching hook and a second latching hook. These latching hooks are members that can be hooked at respective appropriate positions of the cushion spring. The first latching hook is provided so as to be movable in a direction where its corresponding band-shaped belt extends, and the second latching hook is fixed to an end of the corresponding band-shaped belt.

In the above technique, while an area between the seat cushion and the seatback is covered with the hiding cover from a seat rear side, the band-shaped belts are stretched toward a seat forward side and hooked on a back side of the seat cushion. At this time, the band-shaped belts are placed on a back surface of the cushion spring, and the first latching hooks are latched onto a front side of the cushion spring. Subsequently, the seat pad is lifted up, and the band-shaped belts are turned down toward a seat rear side starting from the first latching hooks, while going around a sitting side of the cushion spring. Then, the second latching hooks provided in respective ends of the band-shaped belts are latched onto a rear side of the cushion spring. Hereby, the hiding cover can be attached to the vehicle seat.

SUMMARY OF THE INVENTION

Meanwhile, in the above technique, at the time of an attachment operation of the hiding cover, the band-shaped belts are turned down toward the seat rear side and the second latching hooks are latched onto the cushion spring in a state where the seat pad is lifted upward. On this account, in the configuration of the above technique, it is necessary to perform a latching operation with the seat pad being lifted up. From the viewpoint of improvement in attachment workability of a strip, the configuration is hard to employ.

The present invention provides a vehicle seat in which a strip can be attached to a back side of a seat cushion with a good performance.

A vehicle seat according to an aspect of the present invention includes: a seat cushion including a seat pad, another member disposed on a back side of the seat pad, and a catching portion provided in the another member; a seatback rising from a rear part of the seat cushion; a strip attached to the seatback; and a band member provided in the strip. The band member is stretched in a direction distanced from the seatback and hooked on the catching portion on a back side of the seat cushion while an area between the seat cushion and the seatback is covered with the strip from a seat rear side. According to this type of seat configuration, it is desirable that the strip be attached to the back side of the seat cushion with a good performance (e.g., a good workability).

In the present aspect, the catching portion includes a holding part configured to hold the band member in a hooked state, and a guide part configured to guide the band member toward the holding part. The holding part has an opening that is opened toward a side facing the seat pad, and the holding part is placed at a routing position of the band member in the hooked state. The guide part is a flat part gradually inclined toward a direction distanced from the seat pad while the guide part projects from the opening outwardly or inwardly relative to the routing position of the band member. The band member is inserted into the opening and placed inside the holding part. In the present aspect, it is possible to place and latch the band member inside the holding part by use of the inclined guide part without lifting the seat pad in particular.

In the above aspect, the catching portion may include another holding part configured to hold an additional member different from the band member, and the holding part, the guide part, and the another holding part may be formed integrally. In the above configuration, since the catching portion is formed as an integrally molded product so that the parts are provided relatively firmly, the band member can be held with the additional member stably.

In the above aspect, the catching portion may include a rib provided in a bridging manner between a back surface of the guide part and an outer periphery of the opening. In the present configuration, since the rib can prevent the guide part from deforming to bend toward the opening as much as possible, it is possible to preferably maintain an inclined shape of the guide part at the time of guiding the band member.

In the above aspect, in the opening, a wall that does not make contact with the guide part, among two walls facing the seat pad, may project closer to a seat-pad side than the other wall. In this configuration, since a slight gap is formed between the back surface of the seat pad and the wall that makes contact with the guide part, the band member can be inserted into the opening smoothly. Further, in the above aspect, the catching portion may be made of resin.

According to the above aspect, it is possible to attach the strip to the back side of the seat cushion with a good performance. Further, according to the above aspect, it is possible to attach the strip to the back side of the seat cushion with a further good performance. Further, according to the above aspect, it is possible to preferably maintain an inclined shape of the guide part at the time of guiding the band member. Further, according to the above aspect, the band member can be inserted into the opening smoothly.

BRIEF DESCRIPTION OF THE DRAWINGS

Features, advantages, and technical and industrial significance of exemplary embodiments of the invention will be described below with reference to the accompanying drawings, in which like numerals denote like elements, and wherein.

DETAILED DESCRIPTION OF EMBODIMENTS

Figure 1:
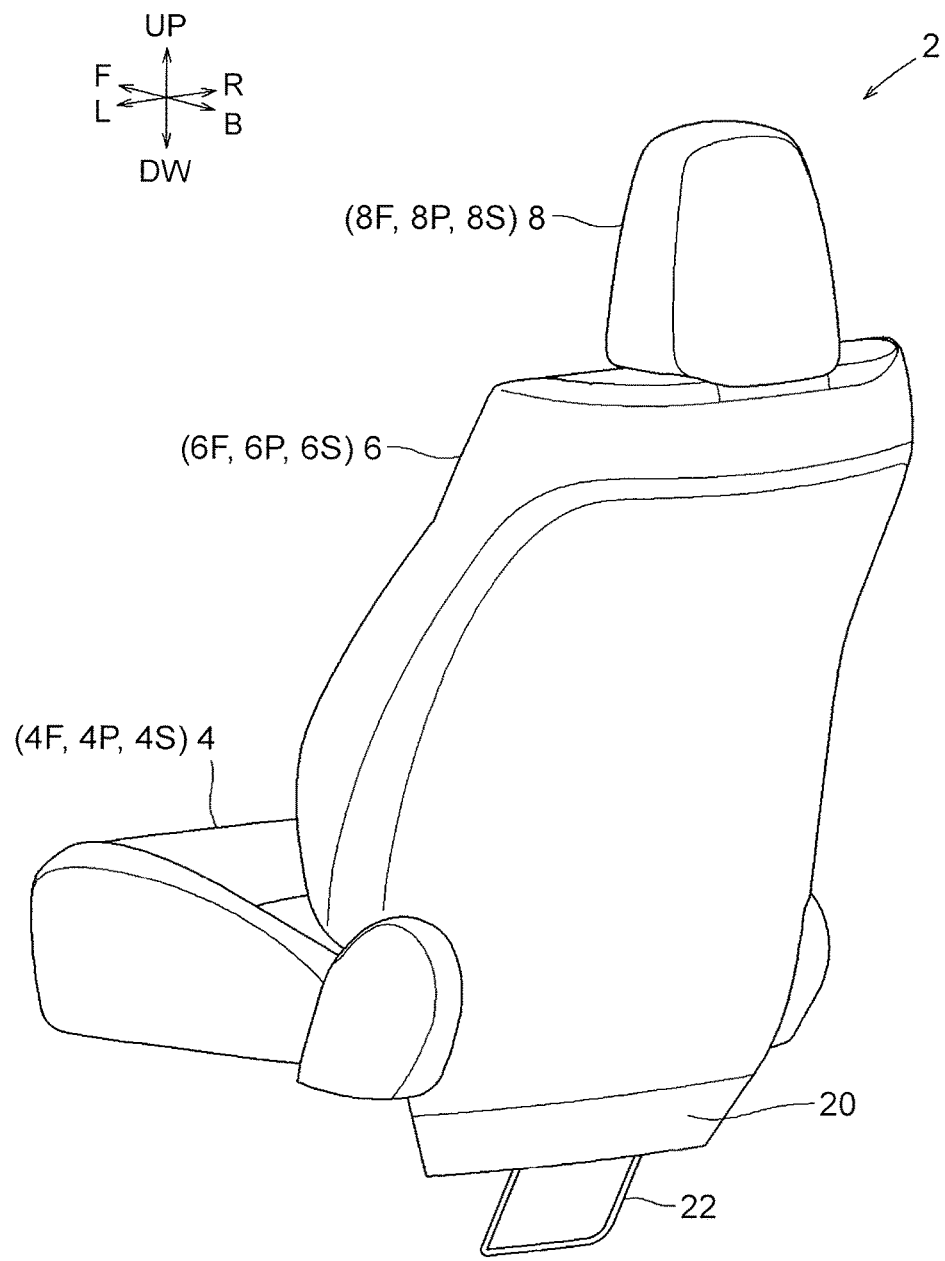
FIG. 1 is a perspective view of a vehicle seat.

The following describes an embodiment for carrying out the present invention with reference to FIGS. 1 to 7. In each of the drawings, a reference sign F is assigned to a vehicle-seat front side, a reference sign B is assigned to a vehicle-seat rear side, a reference sign UP is assigned to a vehicle-seat upper side, and a reference sign DW is assigned to a vehicle-seat lower side, a reference sign R is assigned to a vehicle-seat right side, and a reference sign L is assigned to a vehicle-seat left side, appropriately. A vehicle seat 2 in FIG. 1 includes a seat cushion 4, a seatback 6, and a headrest 8. These seat components each includes: a seat frame (4F, 6F, 8F) forming a seat framework; a seat pad (4P, 6P, 8P) forming a seat outer shape; and a seat cover (4S, 6S, 8S) covering the seat pad. In the present embodiment, a lower part of the seatback 6 is connected to a rear part of the seat cushion 4 (details thereof will be described later) in a rising and tilting manner, and the headrest 8 is disposed on an upper part of the seatback 6 in an upright state. A strip 20 (details thereof will be described later) is provided on a rear face of the seatback 6, and a band member 22 is attached to a lower side of the strip 20.

Figure 2:
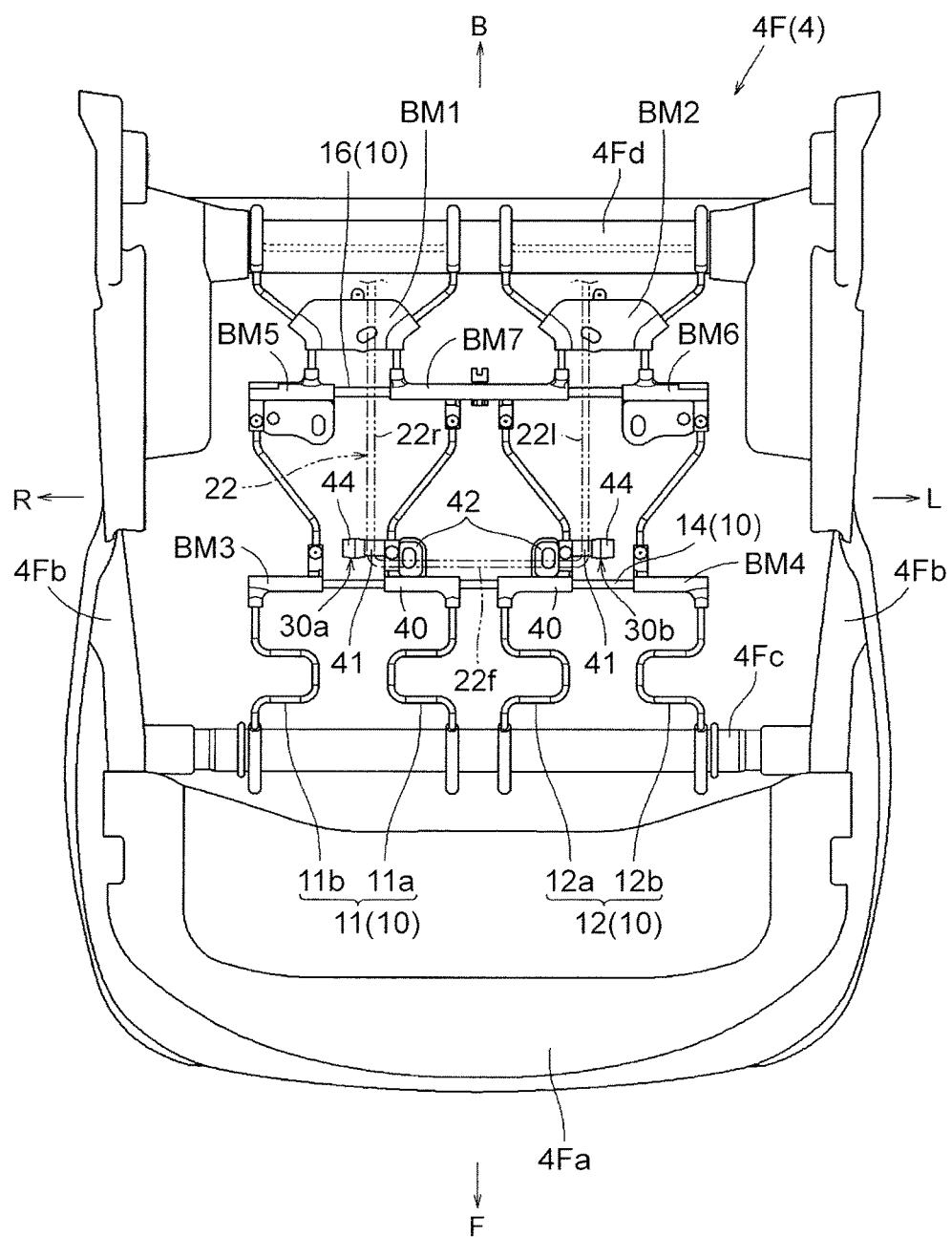
FIG. 2 is a top view of a seat frame.

With reference to FIGS. 1 to 5, the seat cushion 4 includes the abovementioned basic constituents 4F, 4P, 4S, an S-spring 10, and a plurality of catching portions 30a, 30b (details of each member will be described later). In the present embodiment, as will be described later, the seat pad 4P is placed on the seat frame 4F, and then covered with the seat cover 4S. At this time, a back surface of the seat pad 4P is supported by the S-spring 10 in FIG. 2 provided inside the seat frame 4F. With reference to FIG. 1, while an area between the seat cushion 4 and the seatback 6 is covered from a seat rear side with the strip 20 (details thereof will be described later) provided in the seatback 6, the band member 22 of the strip 20 is hooked onto the catching portions 30a, 30b in FIG. 2 placed on a back side of the seat cushion 4. In this type of seat configuration, from the viewpoint of improvement in attachment workability of the strip 20, it is desirable that the band member 22 be able to be latched onto the back side of the seat cushion 4 without lifting the seat pad 4P in particular. In view of this, in the present embodiment, the strip 20 is attached to the back side of the seat cushion 4 with a good performance with the after-mentioned configuration. The following describes each constituent more specifically.

Figure 5:
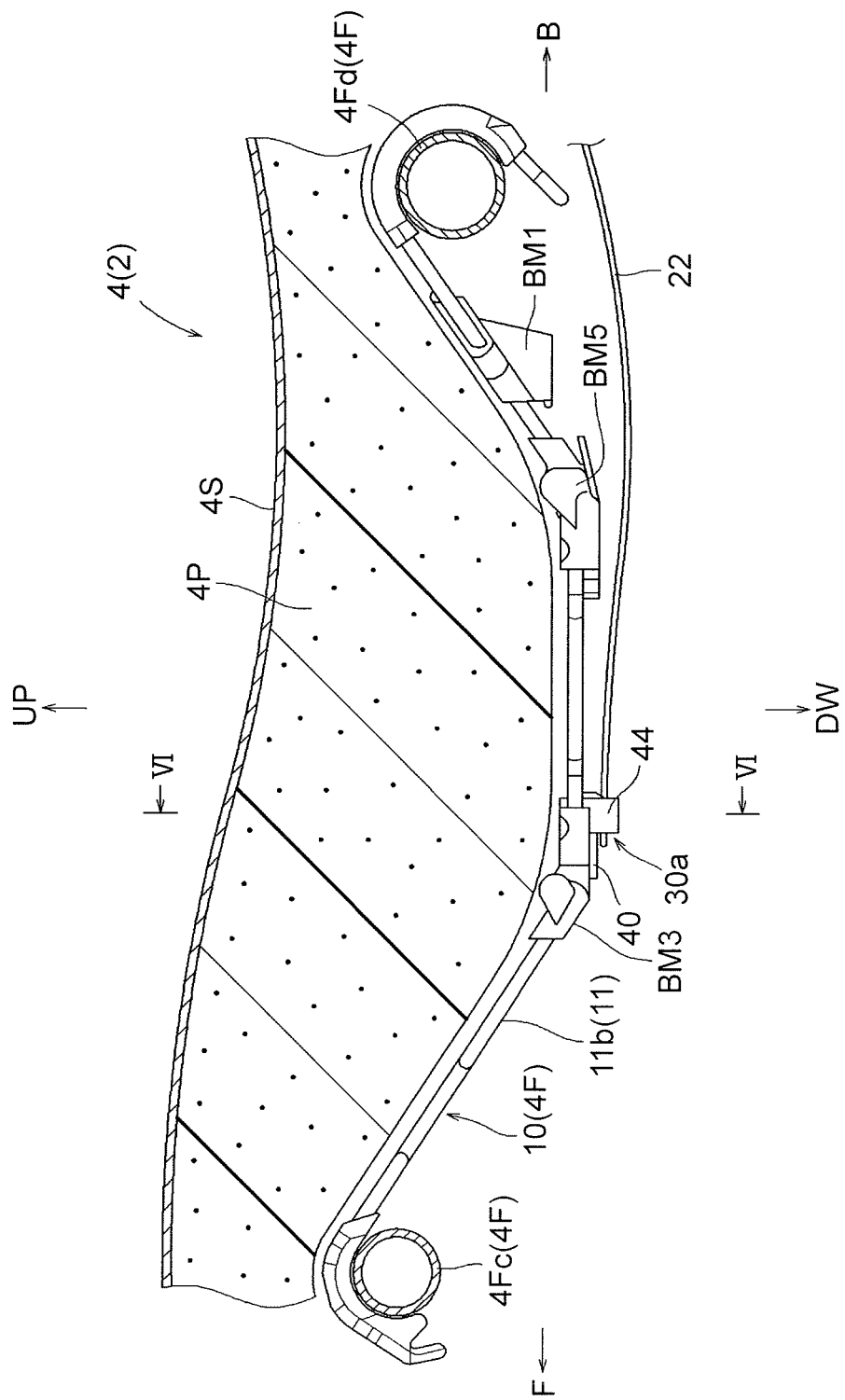
FIG. 5 is a sectional view of part of a seat cushion.

Here, with reference to FIG. 5, the seat cover 4S is a pouch-shaped member that can cover the seat pad 4P, and can be formed of fabric (woven fabric, knitted fabric, nonwoven fabric) or leather (natural leather, synthetic leather), for example. Further, the seat pad 4P is a member having a generally rectangular shape in a top view to form a seat outer shape, and can support an occupant elastically. Although a material of the seat pad 4P is not limited particularly, the seat pad 4P can be formed of foam resin such as polyurethane foam (density: 10 kg/m$^3$ to 60 kg/m$^3$), for example.

With reference to FIG. 2, the seat frame 4F includes a front frame 4Fa, a pair of side frames 4Fb, a reinforcing frame 4Fc, a rear frame 4Fd, and the after-mentioned S-spring 10. Here, the seat frame 4F is typically a metal member, but a material of brackets BM1 to BM7 may be hard resin having moderate rigidity (details thereof will be described later). The front frame 4Fa is a flat member constituting a front part of the seat frame 4F. Further, the pair of side frames 4Fb are flat members constituting side portions of the seat frame 4F, and are placed on right and left sides of the seat so as to face each other. Further, the reinforcing frame 4Fc is a pipe-shaped member elongated in a seat-width direction and is placed in front ends of the pair of side frames 4Fb so as to be provided in a bridging manner therebetween. Further, the rear frame 4Fd is a pipe-shaped member elongated in the seat-width direction, and is placed in rear ends of the pair of side frames 4Fb so as to be provided in a bridging manner therebetween. The rear frame 4Fd is distanced from the reinforcing frame 4Fc appropriately in a seat front-rear direction, and the after-mentioned S-spring 10 is disposed between the frames 4Fc, 4Fd.

The S-spring 10 is one example of another member of the present invention. Referring now to FIG. 5, the S-spring 10 is disposed on a back side of the seat pad 4P. Referring now to FIG. 2, the S-spring 10 includes a pair of support portions (a first support portion 11, a second support portion 12), a pair of connection portions (a first connection portion 14, a second connection portion 16), and a plurality of brackets BM1 to BM7. Here, the first support portion 11 is a generally U-shaped wire spring in a top view and is placed on a seat right side. In a state where the first support portion 11 is attached to the seat frame 4F, the first support portion 11 includes a pair of arm portions (a first inner arm portion 11a, a first outer arm portion 11b) extending toward a seat forward side. The first inner arm portion 11a is bent appropriately in a generally S-shape toward the seat-width direction, and is placed on a seat inner side (a left side in the first support portion 11) in the seat-width direction. Further, the first outer arm portion 11b is bent appropriately in a generally S-shape toward the seat-width direction, and is placed on a seat outer side (a right side in the first support portion 11). Rear parts of the first inner arm portion 11a and the first outer arm portion 11b are connected at the flat first bracket BM1 having a generally rectangular shape. Further, the second support portion 12 is a generally U-shaped wire spring in a top view and is placed on a seat right side. Similarly to the first support portion 11, the second support portion 12 includes a second inner arm portion 12a placed on the right side, a second outer arm portion 12b placed on the left side, and the second bracket BM2 connecting rear parts of both arm portions 12a, 12b.

With reference to FIG. 2, in the present embodiment, the first support portion 11 and the second support portion 12 are placed in parallel at an appropriate interval in the seat-width direction. In this state, the first connection portion 14, which is a bar material elongated in the seat-width direction, is placed in front parts of the support portions 11, 12, and these portions 11, 12, 14 are connected by the front-side brackets BM3, BM4 on the right and left sides. The front-side brackets BM3, BM4 are tubular members bent in a generally L-shape in a top view. The first connection portion 14 and the first outer arm portion 11b are held by being inserted into the front-side bracket BM3 on the right side, and the first connection portion 14 and the second outer arm portion 12*b* are held by being inserted into the front-side bracket BM4 on the left side.

Further, the second connection portion 16, which is a bar material elongated in the seat width direction, is placed in rear parts of the support portions 11, 12, and these portions 11, 12, 16 are connected by a plurality of rear-side brackets BM5 to BM7. The rear-side brackets BM5, BM6 placed on the right and left sides, respectively, are tubular members bent in a generally L-shape, and the rear-side bracket BM7 placed in a center is a linear tubular member. The second connection portion 16 and the first outer arm portion 11*b* are held by being inserted into the rear-side bracket BM5 on the right side, and the second connection portion 16 and the second outer arm portion 12*b* are held by being inserted into the rear-side bracket BM6 on the left side. Further, the second connection portion 16, the first inner arm portion 11*a*, and the second inner arm portion 12*a* are held by being inserted into the rear-side bracket BM7 in the center.

Referring now to FIGS. 2 and 5, the S-spring 10 is disposed inside the seat frame 4F and placed so as to support the seat pad 4P from its back surface. At this time, respective front ends of the arm portions 11*a*, 11 *b* (12*a*, 12*b*) are curved downward so as to form a generally lateral U-shape and then latched onto the reinforcing frame 4Fc. Further, respective rear ends of the arm portions 11*a*, 11 *b* (12*a*, 12*b*) are curved downward so as to form a generally lateral U-shape and then latched onto the rear frame 4Fd.

Here, with reference to FIG. 1, the strip 20 is a planar member forming a generally reverse trapezoidal shape in a front view, and the strip 20 can cover an area between the seat cushion 4 and the seatback 6 from the seat rear side. As a material of the strip 20, it is possible to use the materials exemplified as the material of the seat cover 4S, but it is preferable that the material of the strip 20 be a material having a higher rigidity than the seat cover 4S, and examples of the material of this type include felt, fabric impregnated with resin, and leather. An upper end of the strip 20 is connected to a seat cover portion covering a rear face of the seatback 6, and the band member 22 is provided in a lower part of the strip 20. The band member 22 is a belt-shaped member having a generally U-shape, and both ends thereof are fixed to the lower part of the strip 20. Note that the band member 22 is made of a material having a moderate stretchability, and typically, the band member 22 can be made of a material such as elastomer or rubber.

Figure 3:
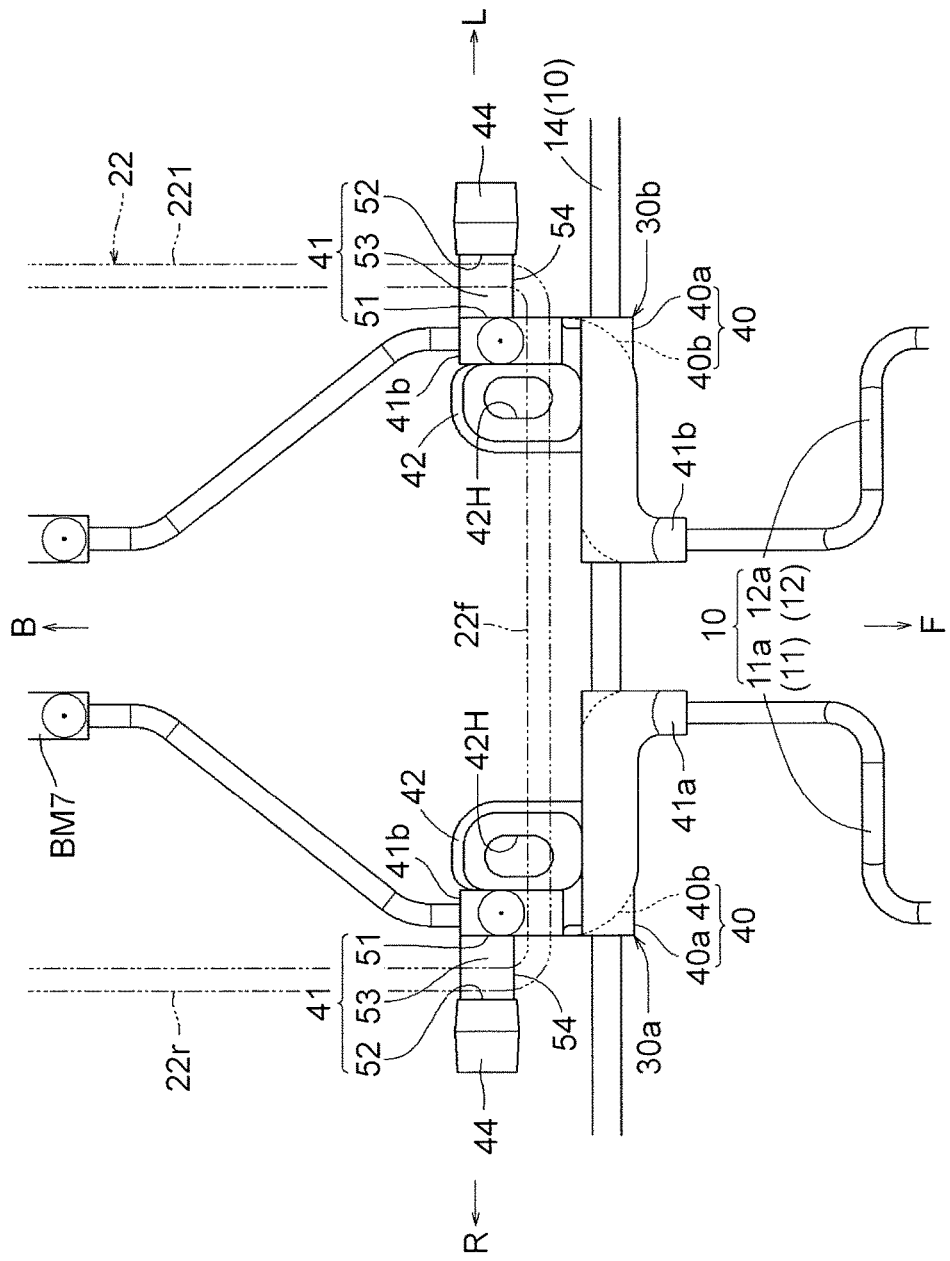
FIG. 3 is a top view of part of the seat frame.
Figure 4:
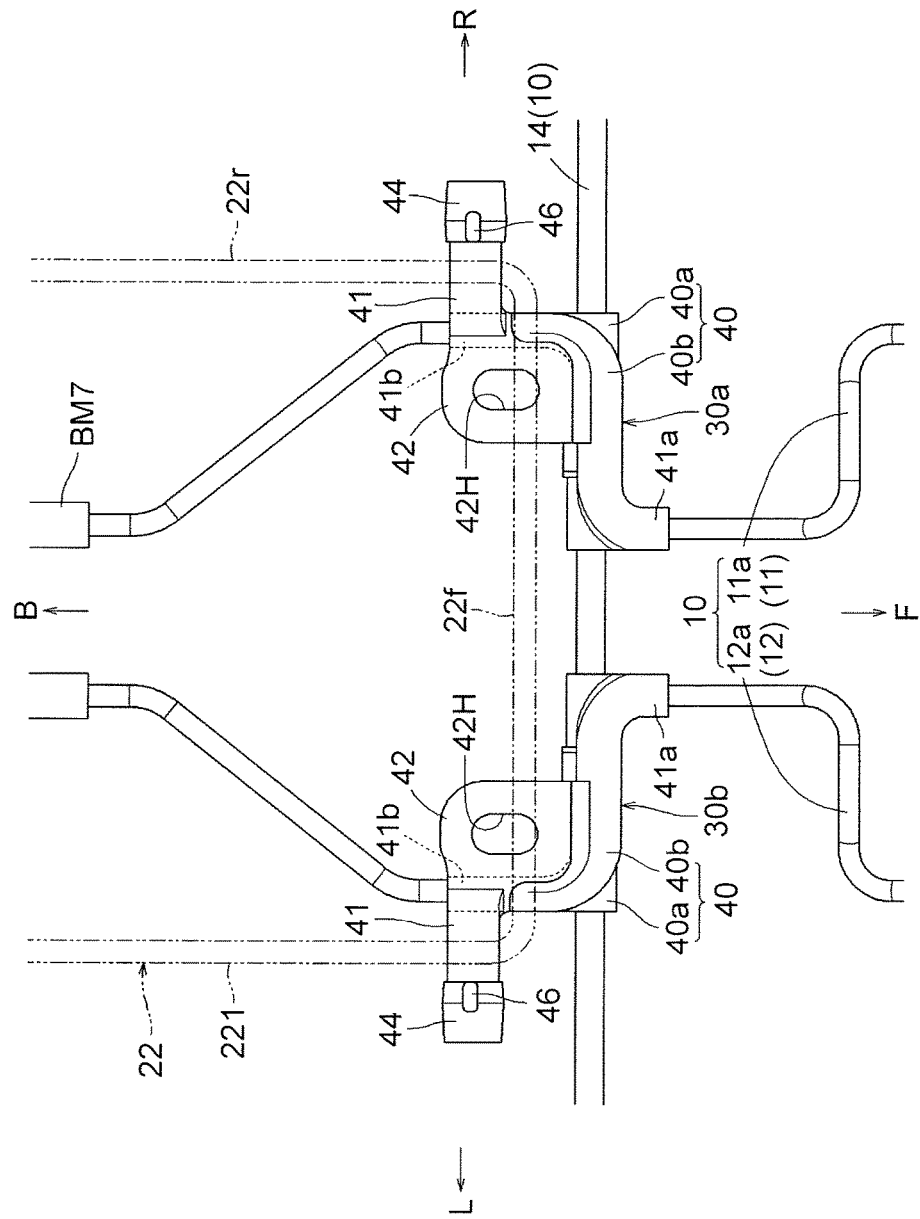
FIG. 4 is a back view of part of the seat frame.

In the present embodiment, with reference to FIGS. 2 to 4, on the basis of a state where the strip 20 is attached, the band member 22 is hooked on the after-mentioned catching portions 30*a*, 30*b* while being stretched toward the seat forward side. At this time, the band member 22 is placed so as to form a generally lateral U-shape in a top view on a back side of the S-spring 10, and a front part 22*f* of the band member 22 is routed, extending in the seat-width direction along the first connection portion 14. Further, a right side 22*r* of the band member 22 in the seat-width direction is routed in a linear shape in the seat front-rear direction while running on a right side relative to the first inner arm portion 11*a*. Then, a left side 22l of the band member 22 is routed in a linear shape in the seat front-rear direction while running on a left side relative to the second inner arm portion 12*a*.

The pair of catching portions (the first catching portion 30*a*, the second catching portion 30*b*) are parts on which the band member 22 can be hooked. The pair of catching portions can be provided in the S-spring 10 as another member. Here, the first catching portion 30*a* is a part provided on a right side of a front part of the S-spring 10, and the second catching portion 30*b* is a part provided on a left side of the front part of the S-spring 10. The first catching portion 30*a* and the second catching portion 30*b* are members having generally the same configuration except that they are formed in bilateral symmetry, so details thereof will be described below mainly about the first catching portion 30*a* as an example.

With reference to FIGS. 2 to 4, the first catching portion 30*a* is an integrally molded product made of resin, and integrally includes a main body part 40, a first holding part 41, a second holding part 42, and a guide part 44. Here, a type of the resin to form the first catching portion 30*a* is not limited in particular, but typically, it is preferable that the resin be hard resin having a moderate rigidity. Examples of the hard resin of this type include polypropylene resin, polyethylene resin, polyester resin, polyamide resin, polyacetal resin, ABS resin, polycarbonate resin, acrylic resin, styrenic resin, and polyvinyl chloride resin.

With reference to FIGS. 3 and 4, the main body part 40 includes a first insertion part 40*a* into which the first connection portion 14 is inserted, and a second insertion part 40*b* into which the first inner arm portion 11*a* is inserted. With reference to FIG. 3, the first insertion part 40*a* is a tubular part extending in the seat-width direction in a state where the first catching portion 30*a* is attached to the S-spring 10, and the first connection portion 14 is held by being passed therethrough. Further, with reference to FIG. 4, the second insertion part 40*b* is a tubular part integrated with a back side of the first insertion part 40*a*, and the first inner arm portion 11*a* is held by being passed therethrough. The second insertion part 40*b* bends in a crank shape along a shape of the first inner arm portion 11*a*, such that an inner end 41*a* placed on the left side in the seat-width direction bends toward the seat forward side and an outer end 41*b* placed on the right side bends toward the seat rear side. The first connection portion 14 and the first inner arm portion 11*a* are held by being passed through their corresponding insertion parts 40*a*, 40*b*, so as to be connected to each other via the main body part 40. Note that, in the second catching portion 30*b*, the first connection portion 14 is held by the first insertion part 40*a*, and the second inner arm portion 12*a* is held by the second insertion part 40*b*.

The first holding part 41 is one example of a holding part of the present invention, and with reference to FIGS. 3 and 4, the band member 22 can be held by the first holding part 41 in a hooked state. The first holding part 41 of the first catching portion 30*a* is integrated with the outer end 41*b* of the second insertion part 40*b* and is placed so as to project toward a seat outer side relative to the outer end 41*b*. That is, with reference to FIGS. 4 and 6, in the first catching portion 30*a*, the first holding part 41 extends in the seat front-rear direction and projects toward the right side relative to the outer end 41*b*, so as to be placed at a routing position of the right side 22*r* of the band member 22. Note that, in the second catching portion 30*b*, the first holding part 41 extends in the seat front-rear direction and projects toward the left side relative to the outer end 41*b*, so as to be placed at a routing position of the left side 22l of the band member 22.

Figure 6:
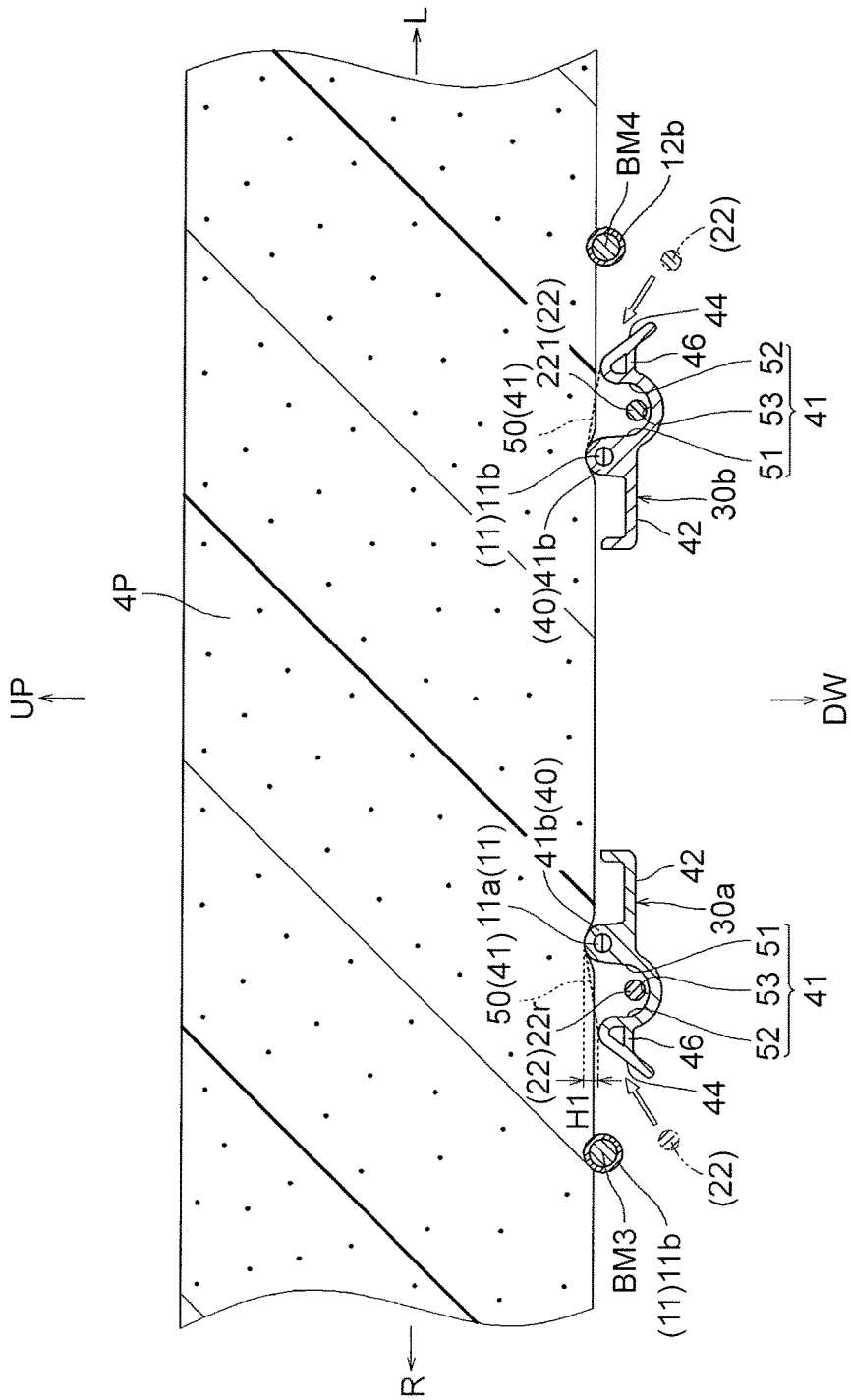
FIG. 6 is a sectional view of part of the seat cushion, corresponding to a section taken along a line VI-VI in FIG. 5.

With reference to FIG. 6, the first holding part 41 is a tubular portion having a generally U-shape in a section view, and includes an opening 50 opened upward so as to face the seat pad 4P, an inner wall 51, an outer wall 52, and a bottom wall 53. In the first holding part 41 of the first catching portion 30*a*, the inner wall 51 is a wall body placed on the left side, which is a seat inner side, and the outer wall 52 is a wall body placed on the right side, which is a seat outer side. Further, the bottom wall 53 is a wall body forming a bottom face of the first holding part 41, and is placed between a bottom end of the inner wall 51 and a bottom end of the outer wall 52 to form a curve projecting downward. In the present embodiment, in a state where the first catching portion 30a is attached to the S-spring 10, the inner wall 51 is placed so as to project toward a seat-pad-4P side relative to the outer wall 52 (a difference H1 in projecting dimension between both walls). In a state where the first catching portion 30a is attached to the S-spring 10, the inner wall 51 abuts with the back surface of the seat pad 4P, while a slight gap is formed between the back surface of the seat pad 4P and the outer wall 52. Note that, in the first holding part 41 of the second catching portion 30b, the inner wall 51 is placed on the right side, which is a seat inner side, and the outer wall 52 is placed on the left side, which is a seat outer side.

Figure 7:
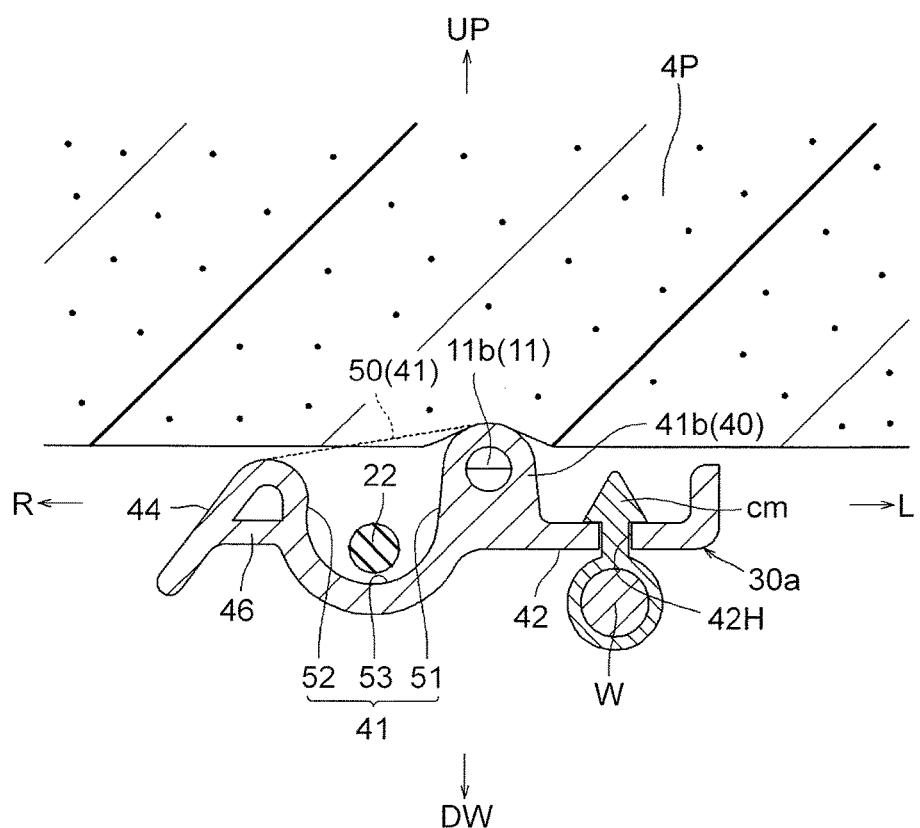
FIG. 7 is a sectional view of part of the seat cushion and illustrates a latching portion that holds an additional member.

The second holding part 42 is one example of another holding part of the present invention, and referring to FIG. 7, the second holding part 42 can hold a clip cm as an additional member. With reference to FIGS. 3 and 4, the second holding part 42 of the first catching portion 30a is a flat part projecting rearward from the main body part 40 and placed so as to face the back surface of the seat pad 4P. An attachment hole 42H penetrating through the second holding part 42 in a thickness direction is formed in a center of the second holding part 42, and the clip cm can be held by being inserted into the attachment hole 42H. With reference to FIG. 7, the clip cm is attached to a wire material W routed on a back side of the S-spring 10. While the clip cm is held by the second holding part 42, the wire material W can be routed at a right position on the back surface of the S-spring 10. Note that the second holding part 42 of the second catching portion 30b has the same configuration as the second holding part 42 of the first catching portion 30a.

With reference to FIGS. 3 and 4, the guide part 44 is a flat part that guides the band member 22 toward the first holding part 41, and projects from the opening 50 outwardly relative to the routing position of the band member 22. That is, with reference to FIG. 6, in the first catching portion 30a, the guide part 44 projects rightward from an upper end of the outer wall 52, and gradually inclines downward apart from the seat pad 4P. The upper end of the outer wall 52 is an upper edge of the opening 50. The guide part 44 can be formed generally over an overall length of the upper end of the outer wall 52 extending in the front-rear direction. With reference to FIGS. 4 and 6, a flat rib 46 projects on a back side of the guide part 44, and the rib 46 is provided in a bridging manner between the back surface of the guide part 44 and the outer wall 52. Since the rib 46 prevents the guide part 44 from deforming to bend toward the outer wall 52 as much as possible, it is possible to preferably maintain an inclined shape of the guide part 44 at the time of guiding the band member 22 (described later). Note that the guide part 44 of the second catching portion 30b has generally the same configuration as the guide part 44 of the first catching portion 30a except that the guide part 44 projects leftward from the upper end of the outer wall 52.

With reference to FIGS. 2 to 4, the first catching portion 30a and the second catching portion 30b are attached to appropriate positions of the S-spring 10 in bilateral symmetric. At this time, while the first catching portion 30a is attached to the right side of the front part of the S-spring 10 via the main body part 40, the first holding part 41 is placed at the routing position of the right side 22r of the band member 22 such that the first holding part 41 projects rightward relative to the first inner arm portion 11a. Further, while the second catching portion 30b is attached to the left side of the front part of the S-spring 10 via the main body part 40, the first holding part 41 is placed at the routing position of the left side 22l of the band member 22 such that the first holding part 41 projects leftward relative to the second inner arm portion 12a. As such, the first holding parts 41 of the catching portions 30a, 30b are placed at the routing positions of the band member 22, and the guide parts 44 are placed in a projecting manner toward the seat outer side from respective openings 50 of their corresponding first holding parts 41.

With reference to FIGS. 5 and 6, after the S-spring 10 is attached inside the seat frame 4F, the seat pad 4P is placed on the S-spring 10 and is covered with the seat cover 4S. Then, an area between the seat cushion 4 and the seatback 6 is covered with the strip 20 in FIG. 1 from the seat rear side, and the band member 22 is drawn toward the back surface of the seat cushion 4 and hooked onto the catching portions 30a, 30b. In this type of seat configuration, it is desirable that the band member 22 of the strip 20 be attached to the back side of the seat cushion 4 without lifting the seat pad 4P in particular.

In view of this, in the present embodiment, with reference to FIG. 6, the first holding part 41 and the guide part 44 are provided in each of the catching portions 30a, 30b. The guide part 44 is gradually inclined downward while projecting outwardly relative to the routing position of the band member 22 from the opening 50 of the first holding part 41. Then, the band member 22 is moved along the guide part 44 and inserted into the opening 50 that the band member 22 is placed inside the first holding part 41, thereby hooking the band member 22 onto the back side of the seat cushion 4.

That is, with reference to FIGS. 2 to 4, in the present embodiment, the band member 22 is stretched forward so as to have a generally lateral U-shape in a top view. At this time, the right side 22r of the band member 22 is extended in a linear shape in the seat front-rear direction while running on the right side of the first inner arm portion 11a, and the left side 22l of the band member 22 is extended in a linear shape in the seat front-rear direction while running on the left side of the second inner arm portion 12a. In view of this, with reference to FIG. 6, without lifting the seat pad 4P in particular, the right side 22r of the band member 22 is guided to the opening 50 so as to be placed inside the first holding part 41 while being gradually moved upward and leftward along the guide part 44 of the first catching portion 30a. At this time, since a slight gap is provided between the back surface of the seat pad 4P and the outer wall 52, the right side 22r of the band member 22 can be inserted into the opening 50 smoothly. Further, similarly, the left side 22l of the band member 22 is guided to the opening 50 so as to be placed inside the first holding part 41 while being gradually moved upward and rightward along the guide part 44 of the second catching portion 30b. Hereby, with reference to FIG. 3, the band member 22 is hooked onto front edges 54 of the right and left first holding parts 41, so that the band member 22 is held by the catching portions 30a, 30b in a hooked state. As such, in the present embodiment, it is possible to guide the right side 22r and the left side 22l of the band member 22 from their corresponding guide parts 44 into their corresponding first holding parts 41 without lifting the seat pad 4P in particular.

As described above, in the present embodiment, it is possible to place and latch the band member 22 inside the first holding parts 41 by use of the inclined guide parts 44 without lifting the seat pad 4P in particular. Further, in the present embodiment, each of the catching portion 30a, 30b is formed as the integrally molded product made of resin so that the parts 40, 41, 42, 44 are provided relatively firmly. Accordingly, it is possible to stably hold the band member 22 together with the clip cm as an additional member. Hereby, according to the present embodiment, it is possible to attach the strip 20 to the back side of the seat cushion 4 with a good performance.

The vehicle seat of the present embodiment is not limited to the above embodiment, and other various embodiments can be employed. For example, the present embodiment exemplifies the configuration of the catching portions 30a, 30b (a shape, a dimension, a disposition position, a disposition number), but is not intended to limit the configuration of the catching portions 30a, 30b. For example, a single catching portion formed by connecting the pair of catching portions of the present embodiment as one piece can be used. Further, a single catching portion may be provided in the first connection portion or in the second connection portion so as to be placed between a pair of support portions, and a front part of the band member may be hooked on the catching portion. The catching portion can be provided at an appropriate position of the S-spring depending on the routing position of the band member, and for example, the catching portion can be provided in any of disposition places of the brackets.

Further, the present embodiment exemplifies configurations (a shape, a dimension, a formation position, a formation number, and the like) of the parts 40, 41, 42, 44 of the catching portion, but is not intended to limit the configurations of these parts. For example, in the present embodiment, the guide part is provided on an outer side relative to the routing position of the band member, but can be provided on an inner side relative to the routing position of the band member according to the routing position of the band member. For example, with reference to FIG. 3, the following case is assumed that the right side 22r of the band member 22 is routed on the left side relative to the first inner arm portion 11a. In this case, the first holding part 41 of the first catching portion 30a can be placed on the left side relative to the outer end 41b, and further, the guide part 44 can be placed on the left side, which is the inner side relative to the routing position of the band member 22.

Further, the first holding parts can be formed along the main body part extending in the seat-width direction so as to hold the front part of the band member. In this case, the guide part can be placed so as to project toward the seat rear side. A shape of each wall forming the first holding part is modifiable appropriately, and the opening may be provided on a seat-pad side relative to a bottom wall. Further, the present embodiment exemplifies the second holding part as another holding part, but one or more other holding parts can be provided in each of the catching portions, and further, the other holding parts can be omitted. Note that examples of the additional member include various members such as a wire itself, a sensor, and a bracket, except for the clip. Further, a hold piece that can hold another member can be provided in the holding part in addition to the attachment hole.

Further, the present embodiment exemplifies a configuration (a shape, a dimension, an arrangement position, a disposition number, and the like) of the band member 22, but is not intended to limit the configuration of the band member 22. For example, a plurality of band members can be provided in the strip, and the band members can be configured to be hooked on individual catching portions or the same catching portion. Similarly, the configuration of the strip can be modified appropriately.

Further, the present embodiment exemplifies a configuration of the vehicle seat, but is not intended to limit the configuration of the vehicle seat. For example, a gap may be provided between the seat cushion and the seatback, or no gap may be provided therebetween. Further, examples of another member include various members such as the wire itself, the sensor, and the bracket, in addition to the S-spring. The configuration of the present embodiment is applicable to a general vehicle seat for a vehicle, an aircraft, a train, and the like.

What is claimed is:

1. A vehicle seat comprising:
a seat cushion including a seat pad, a cushion spring disposed on a back side of the seat pad, and a catching portion provided in the cushion spring;
a seatback rising from a rear part of the seat cushion;
a strip attached to the seatback; and
a band member provided in the strip, wherein:
the band member is stretched in a direction distanced from the seatback and hooked on the catching portion on a back side of the seat cushion while an area between the seat cushion and the seatback is covered with the strip from a seat rear side;
the catching portion includes a holding part configured to hold the band member in a hooked state, and a guide part configured to guide the band member toward the holding part;
the holding part has an opening opened toward a side facing the seat pad and is placed at a routing position of the band member in the hooked state;
the guide part is a flat part gradually inclined toward a direction distanced from the seat pad while the guide part projects from the opening outwardly or inwardly relative to the routing position of the band member; and
the band member is inserted into the opening and placed inside the holding part.

2. The vehicle seat according to claim 1, wherein the catching portion includes another holding part configured to hold a clip, and the holding part, the guide part, and the another holding part are formed integrally.

3. The vehicle seat according to claim 1, wherein the catching portion includes a rib provided in a bridging manner between a back surface of the guide part and an outer periphery of the opening.

4. The vehicle seat according to claim 1, wherein the opening is configured such that a wall that does not make contact with the guide part, among two walls facing the seat pad, projects closer to a seat-pad-(4P) side than the other wall.

5. The vehicle seat according to claim 1, wherein the catching portion is made of resin.

* * * * *